3,311,502
DIDYMIUM HYDRATE ADDITIVE TO NICKEL
HYDROXIDE ELECTRODES
Hugh L. Dryden, Deputy Administrator of the National
Aeronautics and Space Administration, with respect to
an invention of William N. Carson, Jr., Sumner, Md.
No Drawing. Filed Oct. 19, 1965, Ser. No. 498,167
2 Claims. (Cl. 136—28)

This invention relates to an improvement in storage batteries of the alkaline electrolyte type and more particularly to storage batteries of the nickel-cadmium type and especially to the nickel hydroxide electrode therein.

According to a conventional practice, the nickel hydroxide electrode of the nickel-cadmium cell is made from a porous current carrier, usually a sintered nickel powder plaque, by impregnating the plague with an aqueous solution of nickel nitrate, then drying the wet plaque; thereafter the plaque is immersed in aqueous caustic to convert the nickel nitrate retained in the plaque to the insoluble nickel hydroxide. The treatment is then repeated five to seven times until the desired pick-up of nickel hydroxide has been accomplished. Typically, the positive or nickel electrode is a plaque weighing about 14 grams per square decimeter having deposited thereon about 16 grams of nickel hydroxide and associated water of hydration.

After appropriate water washing and electro chemical cleaning the nickel hydroxide electrodes are assembled with cadmium electrodes of standard impregnation and electrolyte (which typically is 25–35% potassium hydroxide solution) and charged. Standard impregnation cadmium electrode is fabricated in much the same manner as the nickel hydroxide electrode by impregnating a sintered nickel powder plaque with a concentrated solution of cadmium salt, and then precipitating cadmium hydroxide by contact with caustic, etc. Generally speaking the theoretical ampere hour capacity of the cell will depend upon the weight of nickel hydroxide in the positive electrode since normally a substantial excess of cadmium capacity is built into the cell.

The principal object of the present invention is to provide a nickel hydroxide electrode of greatly improved capacity.

Another object is to provide a thin nickel hydroxide electrode of substantial ampere hour capacity.

Still another object of the persent invention is to provide a simplified technique for forming nickel hydroxide electrodes.

An additional object is to provide a light weight nickel-cadmium cell.

Other objects and the advantages of the present invention will become apparent from the description thereof which follows.

Briefly state, the present invention involves including the hydrate of a rare earth mixture known as didymium in the nickel hydroxide of the positive electrode. This is done by including a soluble didymium salt in the initial impregnating solution, the amounts of didymium ranging generally from 2.5 to 15 mole percent of the nickel content of the solution. Presence of didymium acts literally to double the ampere hour capacity of the resulting nickel hydroxide electrode.

The exact reason for this substantial improvement is not known. Without being bound thereto, it is theorized that the didymium hydroxide may act to increase the valance change of the nickel hydroxide during the charge-discharge cycle of the nickel-cadmium cell so that more ampere hours result from the same weight of nickel hydroxide. It is known for certain that the gain in capacity cannot be attributed to incidental corrosion of the nickel plaque during fabrication of the nickel hydroxide electrode therefrom. Test cells have been disassembled and carefully examined. Only a normal amount of corrosion was found in the sintered nickel powder plaque of the nickel hydroxide electrode. To obtain a nickel hydroxide content corresponding to the increased capacity through corrosion of the sintered nickel plaque, would require corrosion of vitrually half of the nickel plaque. The cause of the gain in capacity resolves down to presence of the didymium hydrate.

It has been found also that presence of the didymium hydrate in the nickel hydroxide electrode does not effect the voltage characteristic of the nickel-cadmium cell as a whole, nor does it appear to effect the stability of nickel-cadmium cell under repetitive charge and discharge cycles. In addition presence of the didymium in the positive electrode does not appear to be inconsistent with employment of other additives such as, for example, the use of cobalt for better charge retention and longer cycling life.

A principal advantage of the present invention is believed to reside precisely in the possibility thereby of providing light weight nickel electrodes. The double capacity effect means that half the weight of nickel hydroxide is now required for a given capacity. However, the converse of double capacity from a given nickel hydroxide electrode may not be as feasible. While multiple impregnation treatment is contemplated according to the practice of this invention the doubled effect diminishes upon successive impregnations ultimately becoming lost altogether when the electrode is subjected to the substantial number of impregnation cycles common in the art.

Didymium hydrate is a well known commercially available material but it is not a pure substance, being in fact a mixture of the hydrated oxides of several of the rare earth elements, principally lanthanum and neodymium. The approximate composition of a typical didymium hydrate sample is given below.

DIDYMIUM HYDRATE COMPOSITION

| Metal | Oxide | Percent |
|---|---|---|
| Lanthanum | $La_2O_3$ | 16.9 |
| Cerium | $CeO_2$ | 0.5 |
| Praseodymium | $Pr_6O_{11}$ | 3.5 |
| Neodymium | $Nd_2O_3$ | 12.0 |
| Samarium | $Sm_2O_3$ | 2.0 |
| Gadolinium | $Gd_2O_3$ | 1.3 |
| Yttrium | $Y_2O_3$ | 0.2 |
| Other rare earth's oxides | | 0.6 |
| Foreign metal Ca, Fe, etc. oxides | | 2.4 |

As a practical matter it has been found that the variations which may be experienced from batch to batch of didymium hydrate and even in different sources of supply do not substantially affect the improved results obtained by incorporation of 2.5–15 mole percent didymium hydrate in the nickel hydroxide electrode.

In the actual practice of the method of the present invention the didymium hydrate as received is dissolved in nitric acid and the nitrate substituted in a molar ratio of 2.5–15 mole percent for some of the nickel in the nickel nitrate impregnating solution. For example didymium as $Di(NO_3)_3$ is substituted for 10 mole percent of the $Ni(NO_3)_2$ in a conventional five molar nickel nitrate impregnating solution.

For better understanding of the detailed practice of the present invention, the following exemplary instance of a preferred embodiment thereof is here presented.

*Example I*

The didymium solution is prepared by dissolving 95.5 grams of didymium hydrate in 35 grams of 80% nitric acid prediluted in a 1:1 ratio with water. Then the resulting solution of didymium nitrate is mixed with 1310 grams of nickel nitrate hexahydrate, 3 grams of 80% nitric acid, and sufficient distilled water to form one liter of the nitrate solution. Several standard (SAFT–VO plaques) sintered nickel plaques 1⅝″ x 2⅞″ having a porosity of about 80% are placed into a suitable holder and the assembled plaques heated to 65–70° C. under vacuum. Thereafter the above nitrate solution (65–70° C.) is drawn down into the holder and allowed to remain in contact with the nickel plaques for about five minutes. At the end of this soaking period the nitrate solution is removed and the wet electrodes dried for twenty to thirty minutes at 60–70° C.; thereafter the electrodes are immersed in a large excess of aqueous (25%) sodium hydroxide solution. The caustic treatment serves to convert the nitrate salts retained in the sintered nickel plaques to the insoluble hydroxide hydrate. Thereafter the electrodes are water washed several times in distilled water and electro-chemically cleaned to remove residual nitrate ions; following with thorough washing with distilled water and air drying at room temperature completes the electrode fabrication process. The electrochemical cleaning treatment was electrolysis at one ampere for four hours in 26% sodium hydroxide followed by a repeat of the same treatment in fresh sodium hydroxide solution.

The impregnated nickel hydroxide electrodes are assembled into cells with cadmium electrodes of standard (7-time) impregnation and a 31% aqueous potassium hydroxide electrolyte added. A charging current of 100 milliamperes is applied for 16 hours. Then the cells are discharged at the same current for 8 hours. Further testing of the didymium activated nickel hydroxide electrodes was accomplished by cycling the cells at 100 milliamperes for ten cycles.

The degree of utilization, i.e., the number of ampere hours developed for the cells containing a didymium activated nickel hydroxide electrode was about 2.1. The theoretical maximum is 1.0; and cells with control nickel hydroxide electrodes comparably prepared with a pure nickel hydroxide impregnant attained 0.81. Similar tests substituting other additive materials such as platinum, scandium, gallium, aluminum, indium, ytterbium, and many others all failed to show any improvement comparable to that of the didymium activated nickel hydroxide electrode. In fact many of the other materials resulted in electrodes with a percent utilization considerably below that of the control electrode. Further tests on the cells with didymium activated nickel hydroxide electrodes showed that the charge (0.490) and the voltage at midpoint of the discharge cycle (0.380) was not materially affected, being about the same as the values exhibited by the cells with control electrodes and with most of the nickel hydroxide electrodes containing other additives.

*Example II*

Didymium hydrate from a second source was converted to the dissolved nitrate and substituted for ten mole percent of the nickel in forming a 5 molar metal nitrate impregnating solution. The nickel hydroxide electrodes were formed according to the procedure of Example I.

This time the test cells were tested at 50-milliampere charge and discharge. The test results were quite consistent with the results obtained in Example I. However, the utilization factor climbed to 2.62 with again comparable charge (0.475) and midpoint values (0.360) for the cells containing a didymium activated nickel hydroxide electrode as compared to cells with both control electrode and electrodes doped with other materials.

Since different embodiments of the present invention may be made without departing from the spirit and scope thereof, it should be appreciated that the invention is not limited to the above disclosed preferred embodiments except insofar as specified in the appended claims.

What is claimed is:

1. A nickel-cadmium battery wherein the improvement in combination therewith comprises the positive electrode consisting essentially of nickel hydroxide and from 2.5–15 mole percent of the nickel hydroxide of didymium hydroxide.

2. The cell of claim 1 wherein the hydroxides are disposed on a sintered nickel powder carrier.

References Cited by the Examiner
UNITED STATES PATENTS
1,167,485   1/1916   Edison.

References Cited by the Applicant
UNITED STATES PATENTS
2,634,303   4/1953   Moulton.
2,771,499   11/1956   Fleischer.
3,066,178   11/1962   Winkler.

WINSTON A. DOUGLAS, *Primary Examiner.*

A. SKAPARS, *Assistant Examiner.*